(12) United States Patent
Armstrong-Crews et al.

(10) Patent No.: US 12,140,962 B2
(45) Date of Patent: *Nov. 12, 2024

(54) MODEL FOR EXCLUDING VEHICLE FROM SENSOR FIELD OF VIEW

(71) Applicant: Waymo LLC, Mountain View, CA (US)

(72) Inventors: Nicholas Armstrong-Crews, Mountain View, CA (US); Christian Lauterbach, Campbell, CA (US); Scott McCloskey, Mountain View, CA (US); Peter Morton, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,243

(22) Filed: May 22, 2023

(65) Prior Publication Data
US 2023/0288941 A1    Sep. 14, 2023

Related U.S. Application Data

(63) Continuation of application No. 16/225,745, filed on Dec. 19, 2018, now Pat. No. 11,693,423.

(51) Int. Cl.
*G05D 1/02* (2020.01)
*B60R 11/00* (2006.01)
(Continued)

(52) U.S. Cl.
CPC ........... *G05D 1/0248* (2013.01); *B60W 10/04* (2013.01); *B60W 10/20* (2013.01);
(Continued)

(58) Field of Classification Search
CPC .. G05D 1/0248; G05D 1/0088; G05D 1/0257; G05D 1/0276; G05D 1/0291;
(Continued)

(56) References Cited

U.S. PATENT DOCUMENTS 6,621,420 B1 * 9/2003 Poursartip .............. G08G 1/087
340/906
7,696,866 B2    4/2010 Horvitz
(Continued)

FOREIGN PATENT DOCUMENTS

BR           980527 4 A    3/2000
BR           8301344 U     2/2005
(Continued)

OTHER PUBLICATIONS

Chinese Office Action for Application No. CN201980089550.6 dated Jul. 5, 2023, 23 pgs.
(Continued)

*Primary Examiner* — Donald J Wallace
*Assistant Examiner* — Jalal C Coduroglu
(74) *Attorney, Agent, or Firm* — Botos Churchill IP Law

(57) ABSTRACT

The technology relates to developing a highly accurate understanding of a vehicle's sensor fields of view in relation to the vehicle itself. A training phase is employed to gather sensor data in various situations and scenarios, and a modeling phase takes such information and identifies self-returns and other signals that should either be excluded from analysis during real-time driving or accounted for to avoid false positives. The result is a sensor field of view model for a particular vehicle, which can be extended to other similar makes and models of that vehicle. This approach enables a vehicle to determine when sensor data is of the vehicle or something else. As a result, the detailed modeling allowing the on-board computing system to make driving decisions and take other actions based on accurate sensor information.

21 Claims, 14 Drawing Sheets

(51) Int. Cl.

| | |
|---|---|
| *B60R 11/04* | (2006.01) |
| *B60W 10/04* | (2006.01) |
| *B60W 10/20* | (2006.01) |
| *B60W 30/18* | (2012.01) |
| *G05D 1/00* | (2024.01) |
| *H04Q 9/00* | (2006.01) |

(52) U.S. Cl.
CPC ..... *B60W 30/18145* (2013.01); *G05D 1/0088* (2013.01); *G05D 1/0257* (2013.01); *G05D 1/0276* (2013.01); *H04Q 9/00* (2013.01); *B60R 2011/004* (2013.01); *B60R 11/04* (2013.01); *B60W 2420/403* (2013.01); *B60W 2420/408* (2024.01); *B60W 2554/00* (2020.02); *B60W 2710/20* (2013.01); *B60W 2720/106* (2013.01); *G05D 1/0291* (2013.01)

(58) Field of Classification Search
CPC ................ B60W 10/04; B60W 10/20; B60W 30/18145; B60W 2420/403; B60W 2420/408; B60W 2554/00; B60W 2710/20; B60W 2720/106; H04Q 9/00; B60R 11/04; B60R 2011/004; G01S 17/87; G01S 17/931; G01S 13/865; G01S 13/867; G01S 13/87; G01S 17/86; G01S 2013/9323; G01S 2013/93271; G01S 2013/93273; G01S 13/931
See application file for complete search history.

(56) References Cited

U.S. PATENT DOCUMENTS

| | | | | |
|---|---|---|---|---|
| 8,301,344 | B2* | 10/2012 | Simon | B60W 30/16 701/45 |
| 8,872,674 | B1* | 10/2014 | Subramanya | B60Q 9/002 340/939 |
| 8,878,697 | B2 | 11/2014 | Subramanya | |
| 9,003,880 | B2 | 4/2015 | Sbihli et al. | |
| 9,153,084 | B2 | 10/2015 | Ricci | |
| 9,384,661 | B1 | 7/2016 | Deluca et al. | |
| 9,415,721 | B2 | 8/2016 | Subramanya | |
| 9,536,428 | B1 | 1/2017 | Wasserman | |
| 9,792,575 | B2 | 10/2017 | Khasis | |
| 9,805,274 | B2 | 10/2017 | Ayvaci et al. | |
| 9,823,059 | B2* | 11/2017 | Li | G01S 17/46 |
| 9,964,636 | B1 | 5/2018 | Subramanya | |
| 10,055,892 | B2* | 8/2018 | Petrovskaya | G06T 17/20 |
| 10,108,202 | B1 | 10/2018 | Aikin et al. | |
| 10,124,726 | B2 | 11/2018 | Subramanya | |
| 10,438,036 | B1 | 10/2019 | Reome et al. | |
| 10,490,079 | B2 | 11/2019 | Schild | |
| 11,693,423 | B2* | 7/2023 | Armstrong-Crews | G05D 1/0257 701/28 |
| 2006/0245653 | A1* | 11/2006 | Camus | G06V 20/58 382/199 |
| 2011/0208416 | A1 | 8/2011 | Speier et al. | |
| 2012/0050074 | A1 | 3/2012 | Bechtel et al. | |
| 2012/0182392 | A1 | 7/2012 | Kearns et al. | |
| 2013/0226344 | A1 | 8/2013 | Wong et al. | |
| 2014/0087695 | A1* | 3/2014 | Hjelm | H04W 4/38 455/411 |
| 2014/0214255 | A1 | 7/2014 | Dolgov et al. | |
| 2016/0148433 | A1 | 5/2016 | Petrovskaya et al. | |
| 2016/0257188 | A1 | 9/2016 | Sommer et al. | |
| 2016/0357187 | A1 | 12/2016 | Ansari | |
| 2016/0357188 | A1 | 12/2016 | Ansari | |
| 2016/0357262 | A1 | 12/2016 | Ansari | |
| 2016/0358477 | A1* | 12/2016 | Ansari | B60W 60/0059 |
| 2017/0046309 | A1 | 2/2017 | Hubauer et al. | |
| 2017/0129400 | A1 | 5/2017 | Subramanya | |
| 2017/0146343 | A1* | 5/2017 | Matsuo | H04N 13/239 |
| 2017/0220874 | A1* | 8/2017 | Ayvaci | G06F 18/22 |
| 2017/0318360 | A1 | 11/2017 | Tran et al. | |
| 2018/0032084 | A1* | 2/2018 | Dolgov | G05D 1/0276 |
| 2018/0174462 | A1* | 6/2018 | Um | G08G 1/166 |
| 2018/0229724 | A1 | 8/2018 | Gutmann | |
| 2018/0259640 | A1 | 9/2018 | Correia et al. | |
| 2018/0288586 | A1 | 10/2018 | Tran et al. | |
| 2018/0348764 | A1 | 12/2018 | Zhang et al. | |
| 2019/0056492 | A1 | 2/2019 | Geiger et al. | |
| 2020/0099835 | A1 | 3/2020 | Chang et al. | |
| 2020/0099872 | A1 | 3/2020 | Benemann et al. | |
| 2020/0148106 | A1 | 5/2020 | Subramanya | |
| 2020/0148201 | A1* | 5/2020 | King | G06N 20/00 |
| 2020/0178849 | A1 | 6/2020 | Cheng et al. | |
| 2020/0201351 | A1 | 6/2020 | Armstrong-Crews et al. | |

FOREIGN PATENT DOCUMENTS

| | | |
|---|---|---|
| CN | 101689287 A | 3/2010 |
| CN | 104105981 B | 4/2016 |
| DE | 19619275 A1 | 11/1997 |
| DE | 19827833 A1 | 1/1999 |
| DE | 10336638 A1 | 2/2005 |
| GB | 2115790 A | 9/1983 |
| GB | 2139258 A | 11/1984 |
| GB | 2326421 A | 12/1998 |
| JP | 2009087228 A | 4/2009 |
| JP | 2013239015 A | 11/2013 |
| KR | 20120134333 A | 12/2012 |
| KR | 20150062561 A | 6/2015 |
| KR | 20180032084 A | 3/2018 |
| MX | 9805274 A | 12/1998 |
| WO | 8301344 A1 | 4/1983 |
| WO | 980527 4 A1 | 2/1998 |
| WO | 2012154099 A1 | 11/2012 |
| WO | 2014116512 A1 | 7/2014 |
| WO | 2015165611 A1 | 11/2015 |
| WO | 2015198410 A1 | 12/2015 |
| WO | 2017076827 A1 | 5/2017 |

OTHER PUBLICATIONS

International Search Report and Written Opinion for Application No. PCT/US2019/066771 dated Apr. 20, 2020.

The Extended European Search Report for European Patent Application No. 19899372.7, Jul. 15, 2022.

Beltran, et al., "BirdNet: A 3D Object Detection Framework from LiDAR information", arXiv:1805.01195v1, [cs.CV], IEEE, May 3, 2018, 8 pages.

Bertozzi, et al., "360° Detection and Tracking Algorithm of Both Pedestrian and Vehicle Using Fisheye Images", IEEE Intelligent Vehicles Symposium (IV), Coex, Seoul, Korea, Jun. 28-Jul. 1, 2015, 6 pages.

Guindel, et al., "Automatic Extrinsic Calibration for Lidar-Stereo Vehicle Sensor Setups", arXiv:1705.04085v3 [cs.CV], IEEE, Jul. 27, 2017, 6 pages.

Gupta, et al., "Deep Sensor Fusion for 3D Bounding Box Estimation and Recognition of Objects", Available at <https://github.com/nalavikabindhi/CS230-PointFusion>, retrieved from the Internet on Dec. 13, 2018, 6 pages.

Huval, et al., "An Empirical Evaluation of Deep Learning on Highway Driving", arXiv: 1504-0176v2 [cs.RO], IEEE, Apr. 9, 2015, 8 pages.

Pagel, Frank, "Extrinsic Self-Calibration of Multiple Cameras with Non-0verlapping Views in Vehicles", Lace, R.P.; Society of Photo-Optical Instrumentation Engineers, San Francisco, California, United States; ISBN: 978-0-8194-9943-1, Paper 902606, Feb. 3-5, 2014, 14 pages.

Rachman, Abdul A.S., "3D-LIDAR Multi Object Tracking for Autonomous Driving", Faculty of Mechanical, Maritime and Materials Engineering (3mE) Delft University of Technology, Master of Science Thesis, Nov. 9, 2017, 140 pages.

Se, et al., "Stereo-Vision Based 3D Modeling and Localization for Unmanned Vehicles", International Journal of Intelligent Control and Systems, vol. 13, No. 1, Mar. 2008, pp. 46-57.

(56) References Cited

OTHER PUBLICATIONS

Sheehan, et al., "Automatic Self-Calibration of a Full Field-of-View 3D n-Laser Scanner", Mobile Robotics Group, : Oxford University, {mcs, arh, pnewman} @ robots.ox.ac.uk., retrieved from the Internet on Dec. 13, 2018, 14 pages.

Yang, et al., "Automated Extraction of Road Markings from Mobile Lidar Point Clouds", Photogrammetric Engineering & Remote Sensing, vol. 78, No. 4, Apr. 2012, pp. 331-338.

* cited by examiner

600

610

700

750

820

MODEL FOR EXCLUDING VEHICLE FROM SENSOR FIELD OF VIEW

CROSS REFERENCE TO RELATED APPLICATIONS

The present application is a continuation of U.S. patent application Ser. No. 16/225,745, filed Dec. 19, 2018, the entire disclosures of which are incorporated herein by reference.

BACKGROUND

Vehicles configured to operate in an autonomous driving mode, such as vehicles that do not require a human driver, can be used to aid in the transport of passengers or goods from one location to another. This may include operating in a fully autonomous driving mode where passengers may provide some initial input, such as a destination, and the vehicle maneuvers itself to that destination without further driving input from the passengers. It may also include operating in a semi-autonomous mode, in which certain driving operations are managed by the vehicle and others are managed by a driver.

In order for a vehicle to drive in either a fully or semi-autonomous mode, the vehicle may be largely dependent on systems that are capable of determining its location at any given time, as well as detecting and identifying objects external to the vehicle, such as other vehicles, stop lights, signage, pedestrians, etc. As an example, these systems may include sensors, such as laser scanning equipment (Lidar), radar, and cameras, which may be mounted at various locations on the vehicle. Such sensors may each have a particular field of view (FOV) of the vehicle's external environment. However, obstructions may cause signals that impact a given sensor's FOV. This can result in false positive signals that may affect the understanding of objects in the external environment. And this can impact driving decisions and other actions taken by the vehicle when operating in an autonomous mode.

BRIEF SUMMARY

The technology relates to having a more accurate understanding of the vehicle's sensor fields of view in relation to the vehicle itself. This enables the vehicle to know when sensor data is of the vehicle or something else. In this way, a highly refined model of a given vehicle, or a vehicle type, is developed. While a coarse bounding box may be employed given the general dimensions and shape of a particular make or model, such an approach may not account for different vehicle configurations or active operating conditions. In contrast, a refined 3D mapping of the vehicle, developed according to aspects the technology, can incorporate different configurations or conditions. This 3D mapping is used to eliminate signals in the sensor data due to the vehicle itself, thereby allowing the system to make driving decisions and take other actions based on accurate sensor information.

Aspects of the technology include a method for generating a sensor field of view (FOV) model for a vehicle. The method comprises obtaining, from one or more sensors mounted on the vehicle, sensor data for an environment external to the vehicle; filtering out the sensor data that does not satisfy a predetermined range condition to obtain resultant sensor data; projecting, by one or more processors, the resultant sensor data into a range image, wherein data in the range image includes a plurality of points, each of the plurality of points having a respective range value associated therewith; aggregating, by the one or more processors, the sensor data associated with different sets of obtained sensor data; and creating, by the one or more processors, a 3D mesh representation for each of the one or more sensors, the 3D mesh representation being based on the range image.

The 3D mesh representation for each of the one or more sensors may also be encompassed by points not exceeding a coarse bounding box vehicle model.

In one scenario, the method further comprises transforming the 3D mesh representation from a vehicle frame to a sensor frame using a vehicle-specific extrinsic transform; and projecting 3D coordinates into the sensor frame to create a model range image. In this case, for each new 3D point obtained by a given sensor, the method may include projecting that new 3D point onto the model range image; and filtering out one or more selected points if a range for the one or more selected points does not fall within a given range.

The method may include generating a model of the vehicle from a combination of the 3D mesh representations for each of the one or more sensors. Here, the vehicle model is arranged to exclude the 3D mesh representation when detecting objects external to the vehicle. Here, the method may include applying the vehicle model to a common vehicle make or model to obtain a common vehicle model. In this case, the method may further comprise transmitting the common vehicle model to a fleet of vehicles for use during driving operations in an autonomous driving mode.

Obtaining the sensor data may include operating the vehicle in a real-word environment under one or more scenarios, and gathering the sensor data of the environment external to the vehicle during operation under the one or more scenarios. In this case, the one or more scenarios may include at least one of: a turning scenario in which one or more wheels of the vehicle are turned to a maximal extent; a stationary scenario in which at least one of a door, trunk or hood of the vehicle is placed in a partially or fully open position; or a scenario in which at least one window of the vehicle is open and an object is extended out the window.

In yet another example, creating the 3D mesh representation for each of the one or more sensors includes performing a transformation from sensor frame coordinates to vehicle frame coordinates.

In a further example, the method includes incorporating an intensity channel into the 3D mesh representation to account for different colors or lighting ranges of the obtained sensor data. This may include applying the intensity channel to evaluate whether a sensor on the vehicle is covered by debris, is damaged, or is waterlogged.

According to other aspects of the technology, a processing system comprises memory configured to store obtained sensor data, and one or more processors operatively coupled to the memory. The one or more processors are configured to receive, from one or more sensors of a vehicle, sensor data for an environment external to the vehicle. They are also configured to filter out the sensor data that does not satisfy a predetermined range condition to obtain resultant sensor data and project the resultant sensor data into a range image. Data in the range image includes a plurality of points, where each of the plurality of points having a respective range value associated therewith. The one or more processors are further configured to aggregate the sensor data associated with different sets of obtained sensor data, and to create a 3D mesh representation for each of the one or more sensors, the 3D mesh representation being based on the range image.

The 3D mesh representation for each of the one or more sensors may also be encompassed by points not exceeding a coarse bounding box vehicle model.

In one example, the one or more processors are further configured to transform the 3D mesh representation to a sensor frame using a vehicle-specific extrinsic transform, and project 3D coordinates into the sensor frame to create a model range image. In this case, the one or more processors may be further configured to, for each new 3D point obtained by a given sensor, project that new 3D point onto the model range image, and to filter out one or more selected points if a range for the one or more selected points does not fall within a given range.

In another example, the one or more processors are further configured to incorporate an intensity channel into the 3D mesh representation to account for different colors or lighting ranges of the obtained sensor data.

In a further example, the one or more processors are also configured to generate a model of the vehicle from a combination of the 3D mesh representations for each of the one or more sensors. The vehicle model is arranged to exclude the 3D mesh representation when detecting objects external to the vehicle. In this case, the one or more processors may be further configured to apply the vehicle model to a common vehicle make or model to obtain a common vehicle model.

According to further aspects of the technology, a vehicle comprises a driving system including a steering subsystem, an acceleration subsystem and a deceleration subsystem to control driving of the vehicle, as well as a plurality of wheels configured to contact a driving surface. It also includes a perception system including one or more sensors disposed along the vehicle. At least one of the one or more sensors has a respective detection field of view (FOV). The vehicle also includes a control system including one or more processors. The control system is operatively coupled to the driving system and the perception system, and is configured to operate the vehicle along the driving surface under one or more scenarios; obtain, from the one or more sensors during operation under the one or more scenarios, sensor data for an environment external to the vehicle; transmit the obtained sensor data to a remote system; receive, from the remote system, a model of the vehicle according to the fields of view of the one or more sensors; and operate the vehicle along a roadway in response to the received vehicle model.

In one example, the one or more scenarios includes at least one of a turning scenario in which one or more wheels of the vehicle are turned to a maximal extent; a stationary scenario in which at least one of a door, trunk or hood of the vehicle is placed in a partially or fully open position; or at least one window of the vehicle is open and an object is extended out the window.

DETAILED DESCRIPTION

Overview

The technology involves gathering sensor information during data collection from real-world driving of a vehicle, and using the gathered sensor information in a training phase to create a 3D mapping of the vehicle. During driving, it can be difficult to ascertain whether the sensor is "seeing" the world properly, or if there is some signal due to the vehicle itself or something related to the vehicle, such as a dust cloud or water spray caused by the vehicle's tires driving over the road surface. Thus sensor data should be collected under various conditions and situations. The training phase distills the collected sensor data into a model, which defines what each sensor would typically expect to see (and/or a range of believable sensor readings) of the sensor itself. After training and developing the model (or models), the vehicle's on-board system is able to determine if sensor data is due to self-returns or from another object, and make operating decisions accordingly, for instance in an operational phase.

Example Systems

Figure 1:
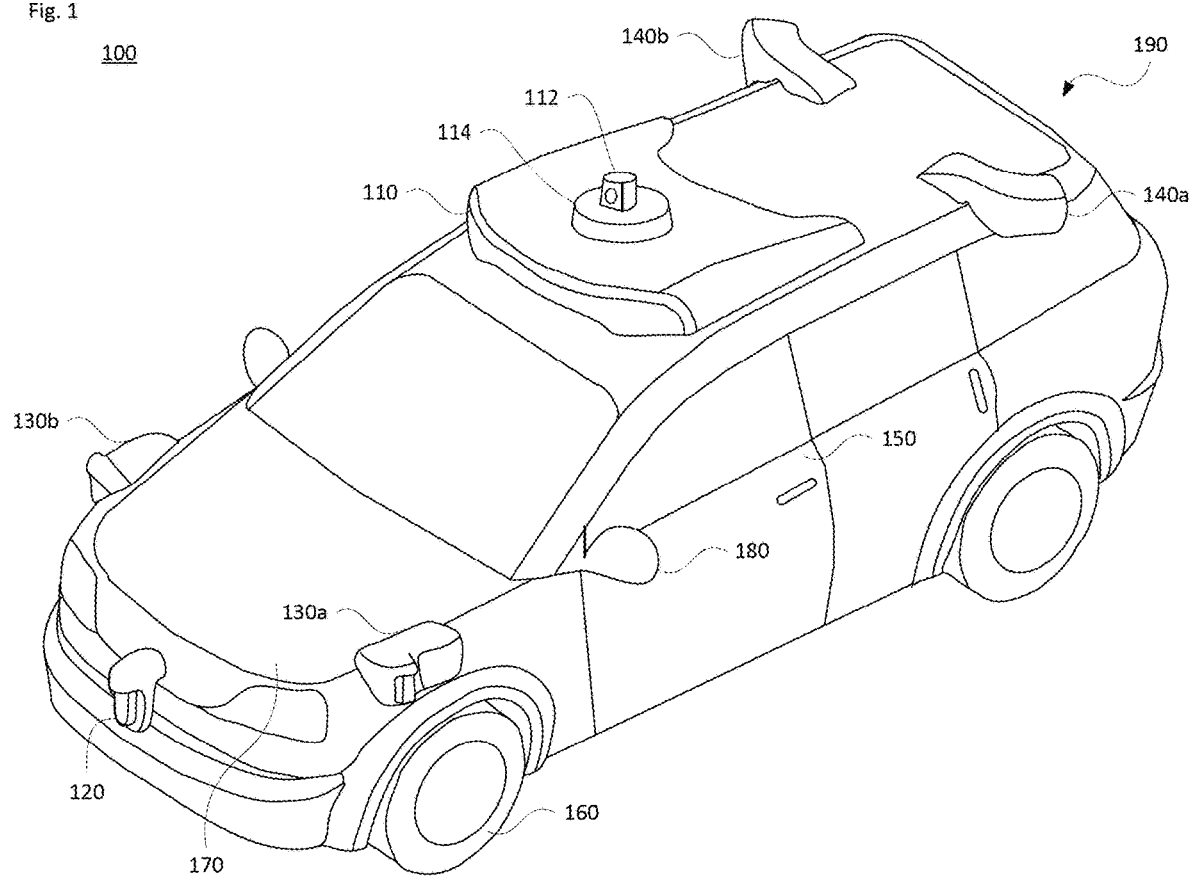
FIG. 1 is a vehicle with sensors in accordance with aspects of the disclosure.

As shown in FIG. 1, a vehicle 100 in accordance with aspects of the disclosure includes various sensors to detect objects in the environment around the vehicle. While certain aspects of the disclosure are particularly useful in connection with specific types of vehicles, the vehicle may be any type of vehicle including, but not limited to, cars, small or large cargo trucks, motorcycles, busses, recreational vehicles, etc. In this example, rooftop housing 110 supports a sensor unit 112, such as a Lidar sensor, which may be part of a sensor assembly 114 incorporating other sensors such as cameras and/or radar units. In addition, housing 120 located at the front end of vehicle 100 and housings 130a, 130b on the driver's and passenger's sides of the vehicle may each include a Lidar sensor and/or other sensors. Other housings 140a and 140b may be placed along other parts of the vehicle, such as towards the upper rear of the vehicle 100 as shown. In this example, housing 130a is located in front of driver door 150, and may be located near the driver's side front tire 160, hood 170 and mirror unit 180. Additional sensor units (not shown) may be located at the front and rear ends of vehicle 100 and/or on other positions along the roof or rooftop housing, such as along area 190.

Figure 2:
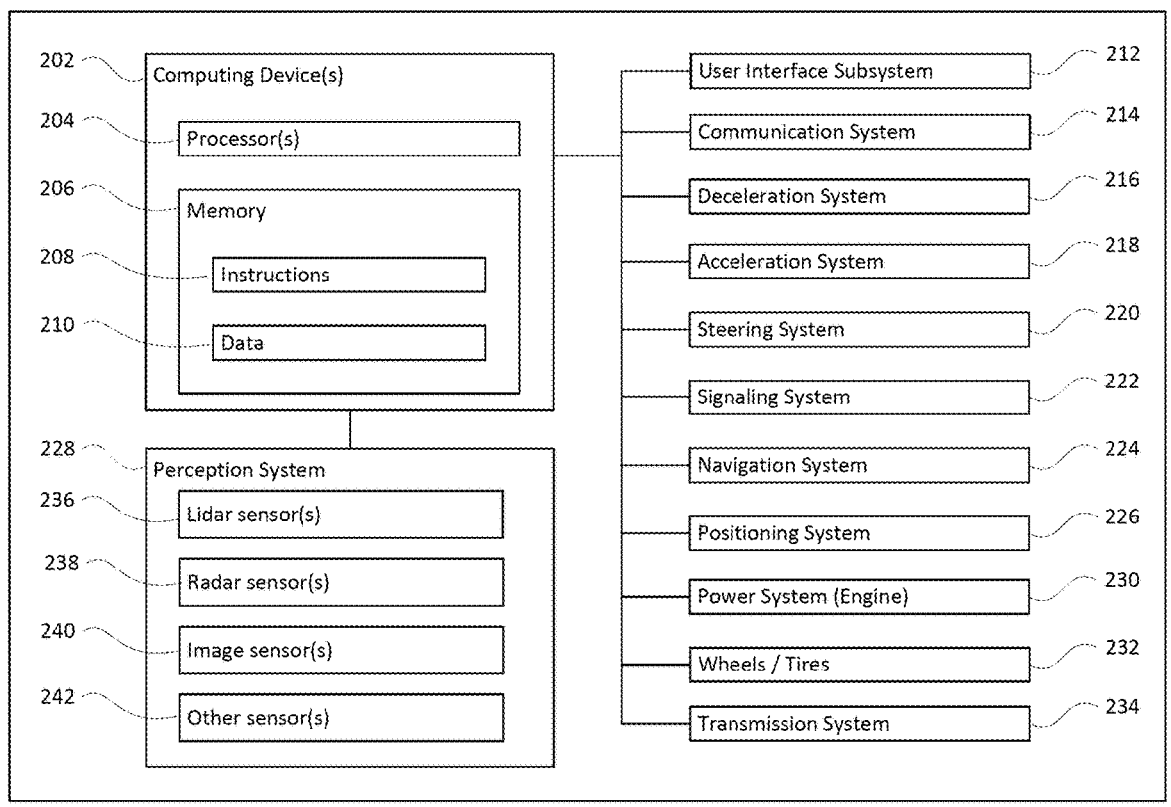
FIG. 2 is system diagram of a vehicle in accordance with aspects of the disclosure.

FIG. 2 illustrates a block diagram 200 of various systems of the vehicle 100. For instance, as shown the vehicle may have one or more computing devices, such as computing devices 202 containing one or more processors 204, memory 206 and other components typically present in general purpose computing devices.

The memory 206 stores information accessible by the one or more processors 204, including instructions 208 and data 210 that may be executed or otherwise used by the processor(s) 204. The memory 206 may be of any non-transitory type capable of storing information accessible by the processor, including a computing device-readable medium, or other medium that stores data that may be read with the aid of an electronic device, such as a hard-drive, memory card, ROM, RAM, optical disks, as well as other write-capable and read-only memories. Systems and methods may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 210 may be retrieved, stored or modified by processor 204 in accordance with the instructions 208. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 204 may be any conventional processors, such as commercially available CPUs. Alternatively, the one or more processors may be a dedicated device such as an ASIC or other hardware-based processor. Although FIG. 2 functionally illustrates the processor, memory, and other elements of computing device(s) 202 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 202. Accordingly, references to a processor or computing device will be understood to include references to a collection of processors or computing devices or memories that may or may not operate in parallel.

Computing devices 202 may include all of the components normally used in connection with a computing device such as the processor and memory described above. The computing devices may include or be associated with a user interface subsystem 212, which may include, e.g., a mouse, keyboard, touch screen and/or microphone, and various electronic displays (e.g., a monitor having a screen or any other electrical device that is operable to display information). For instance, the vehicle may include an internal electronic display as well as one or more speakers to provide information or audio visual experiences. In this regard, the internal electronic display may be located within a cabin of vehicle 100 and may be used by computing devices 202 to provide information to passengers within the vehicle 100.

A communication system 214 may include one or more wireless or wired connections to facilitate communication with other computing devices, such as passenger computing devices (e.g., mobile phones, smart watches, laptop or tablet computers, etc.) and remote server computing devices described further below. Example of a wireless connections include short range communication protocols such as Bluetooth, Bluetooth low energy (LE) and 802.11, cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 202 may be part of an autonomous driving computing system incorporated into vehicle 100. The autonomous driving computing system may capable of communicating with various components of the vehicle in order to maneuver vehicle 100 in a fully autonomous driving mode and/or semi-autonomous driving mode. For example, returning to FIG. 2, computing devices 202 may be in communication with various systems of vehicle 100, such as deceleration system 216, acceleration system 218, steering system 220, signaling system 222, navigation system 224, positioning system 226, perception system 228, power system 230 (for instance, a gasoline or diesel powered motor, electric engine, or a hybrid engine) in order to control the movement, speed, etc. of vehicle 100 in accordance with the instructions 208 of memory 206. The wheels 232 are coupled to transmission system 234, which may also be in communication with computing devices 202. Although these systems are shown as external to computing devices 110, in actuality, different systems may also be incorporated into computing devices 202, e.g., as part of an autonomous driving computing system for controlling vehicle 100 in either a fully or partially autonomous driving mode.

As an example, computing devices 202 may interact with deceleration system 216, acceleration system 218 and transmission system 234 in order to control the speed and related aspects of the vehicle. Similarly, steering system 220 may be used by computing devices 202 in order to control the direction of vehicle 100. For example, if vehicle 100 is configured for use on a road, such as a car or truck, the steering system may include components to control the angle of wheels to turn the vehicle. Signaling system 222 may be used by computing devices 202 in order to signal the vehicle's intent to other drivers or vehicles, for example, by lighting turn signals or brake lights when needed.

Navigation system 224 may be used by computing devices 202 in order to determine and follow a route to a location. In this regard, the navigation system 224 and/or data 210 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways. In addition, this map information may include information regarding traffic controls, such as traffic signal lights, stop signs, yield signs, etc., which, in conjunction with real time information received from the perception system 228, can be used by the computing devices 202 to determine which directions of traffic have the right of way at a given location.

The perception system 228 also includes one or more components for detecting objects external to the vehicle such as other vehicles, bicycles, pedestrians, obstacles in the roadway, traffic signals, signs, trees, etc. For example, the perception system 228 may include one or more Lidar sensors 236, radar sensors 238, cameras or other image sensors 240, and/or other sensors 242 (e.g., sonar devices) capable of detecting objects in the environment around the vehicle. The other sensors 242 may also include any other detection devices that record data about the vehicle that may be processed by computing devices 202, e.g., accelerometers, gyroscopes, etc. The other sensors 242 may further include sensors that detect a status or configuration of the vehicle 100. For instance, the other sensors 242 may sense that a door is partially or fully open, the trunk or hood is partially or fully open, and/or one or more windows are rolled partially or fully down.

The sensors of the perception system may detect objects in the external environment of the vehicle and generate sensor data describing characteristics of such objects such as location, orientation, size, shape, type, direction and speed of movement, etc. The raw sensor data from the sensors and/or the aforementioned characteristics can be quantified or arranged into a descriptive function or vector and sent for further processing to the computing devices 202. As discussed in further detail below, computing devices 202 may use the positioning system 226 to determine the vehicle's location and pose, and use perception system 228 to detect and respond to objects when needed to reach the location safely.

Figure 3A:
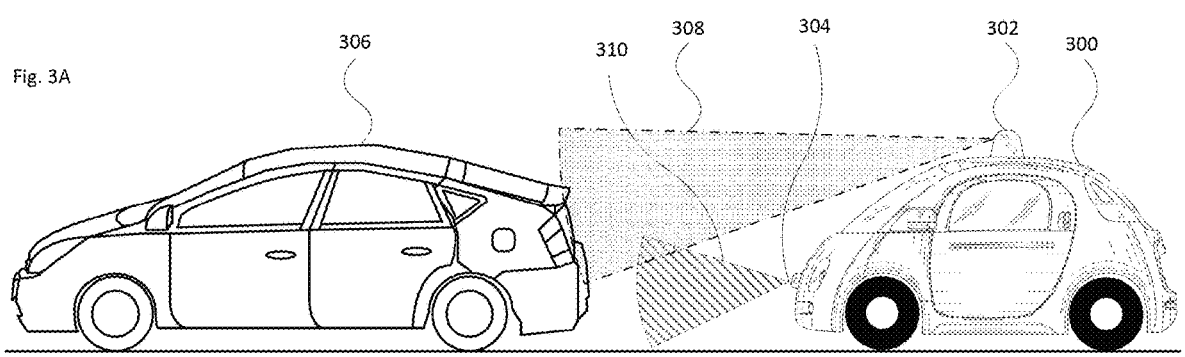
FIGS. 3A-C illustrate examples of sensor FOVs and signals in accordance with aspects of the disclosure.

The Lidar sensors 236, radar sensors, 238, image sensors 240 and/or other sensors 242 of the perception system 228 may each have its own FOV. And each such sensor may be arranged on the vehicle so that at all or part of the FOV for a given sensor overlaps with at least a portion of a field of view of one or more of the other sensors. One example of this is shown in FIG. 3A, which illustrates scenario where there is another vehicle in front of the vehicle configured to operate in an autonomous driving mode. FIG. 3A shows a vehicle 300 having a rooftop sensor assembly 302 and a front sensor assembly 304. The vehicle 300 is behind another vehicle 306. The rooftop sensor assembly 302 has a sensor FOV 308, while the front sensor assembly 304 has a sensor FOV 310. As shown, the sensor FOV 308 may be arranged to detect an upper rear portion of the vehicle 306, while the sensor FOV 310 may detect a lower rear portion of the vehicle 306, and there may be some overlap in the fields of view.

Figure 3B:
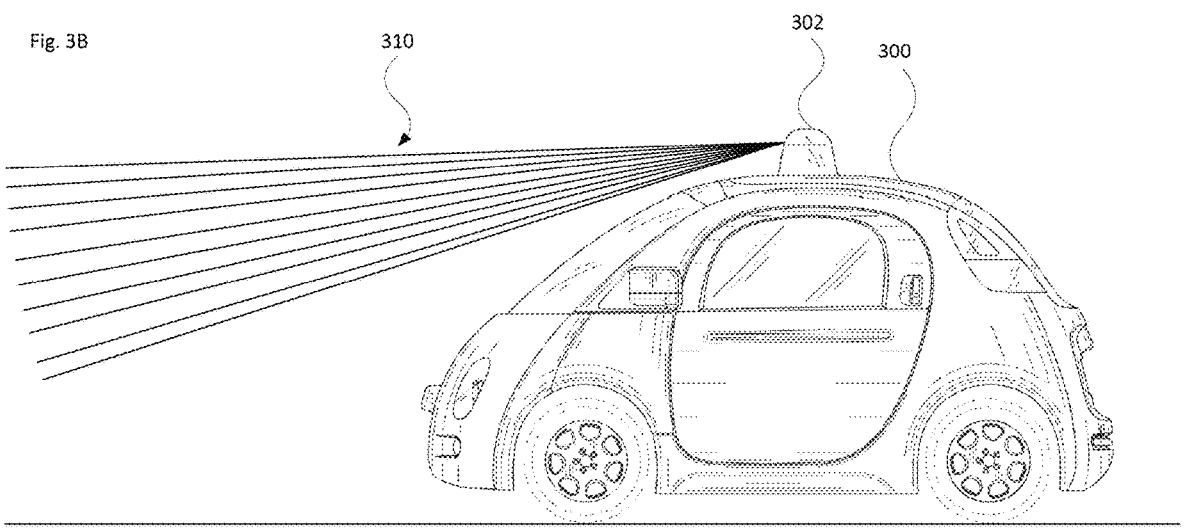

By way of example, the rooftop sensor assembly 302 and/or the front sensor assembly 304 may include one or more Lidar sensors. The rooftop sensor assembly 302 and the front sensor assembly may detect objects in the external environment by making one or more scans of the area around the vehicle. As shown by FIG. 3B, a Lidar sensor of the rooftop sensor assembly may take multiple scans of a region of interest. Here, lines 310 indicate examples of individual scans of the environment. For instance, 10 (or more or less) individual scans may be made by a given sensor per scan period. This may include adjusting the sensor's FOV up or down, left or right, e.g., with a motor or other actuator. The individual scans may be selected to cover particular portions of the sensor's FOV or selected regions around the vehicle.

Figure 3C:
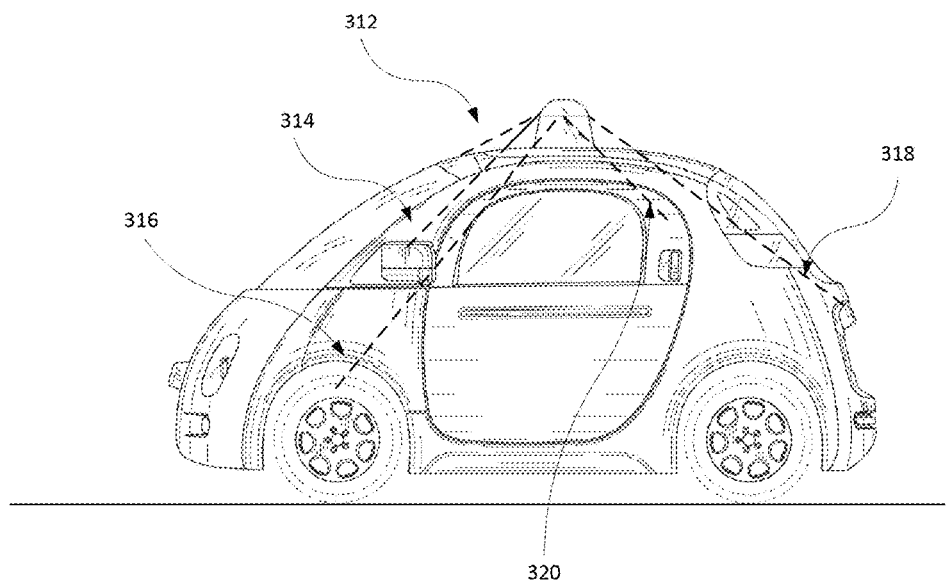

However, the sensor may also receive returns from the vehicle itself (self-returns). For instance, as shown in FIG. 3C, the scans may generate returns from various portions of the vehicle, such as a return 312 from the roof, a return 314 from a side mirror or side sensor, a return 316 from a wheel (e.g., when the vehicle is turning left or right), a return 318 from a partially or fully open trunk, and a return 320 from a partially or fully open door. Other parts of the vehicle may also generate returns, depending on the configuration of the vehicle, the type of sensor, the FOV of the sensor, etc. At operation time, such as when driving autonomously, the system is able to infer that a given return is a self-return if the range of the given return is more than the model's range (at that angle) plus some delta (e.g., 10-50 cm).

Figure 4:
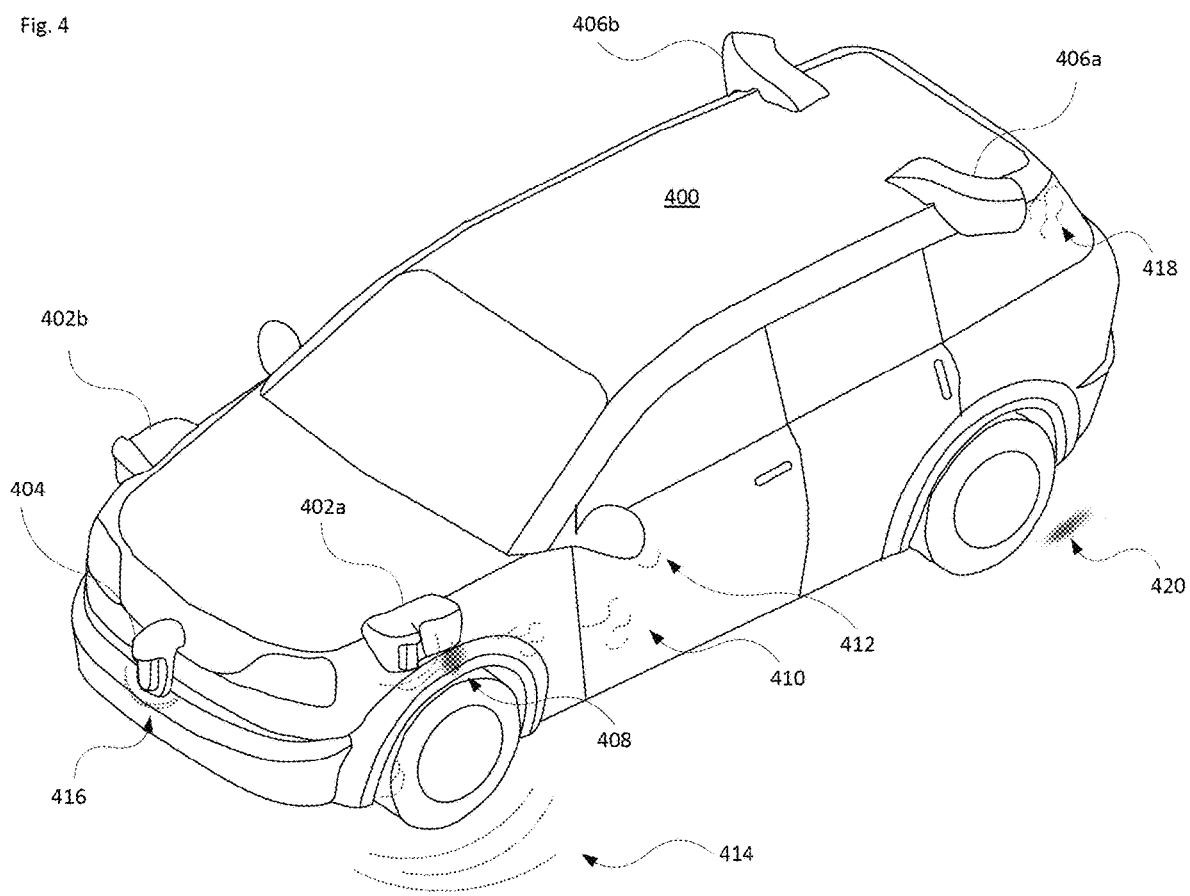
FIG. 4 illustrates sensor data in accordance with aspects of the disclosure.

FIG. 4 illustrates a scenario with examples of close sensor data. As shown here, the vehicle 400 includes a pair of front side sensors 402a,b, a lower front sensor 404, and a pair of rearward mounted sensors 406a,b. Self-returns 408 (quarter panel or sensor housing), 410 (door), 412 (side view mirror) and/or 414 (wheel) may be detected by the front side sensors 402. A self-return signal 416 (front bumper) may be detected by the front sensor 404. And signals 418 (rear quarter panel or trunk) and 420 (dust or water spray) may be detected by rearward mounted sensors 406.

In order to account for this information (e.g., to determine that it is not caused by an object immediately adjacent to the vehicle) and to provide a more robust approach than a coarse bounding box, the technology employs training and modeling phases, as noted above.

Example Methods

Aspects of the technology involve gathering sensor data and using that data to construct a robust model to understand what sensor data is relevant and what can be ignored. While it is possible to manually build a detailed 3D model of a given vehicle, this is labor intensive and does not scale when a model is needed for each individual vehicle or a fleet of similar vehicles. Models may be provided by the vehicle manufacturer based on the "as designed" vehicle. However, these may be insufficient, especially for vehicles with sensors or after-market components (e.g., roof rack, towing hitch, bicycle rack, fishing rod holder, etc.) later added to them. It is also challenging to manually account for all of the possible vehicle states, for instance when the wheels are turning, doors or windows are open, etc.

The gathering of sensor data includes real-world driving of the vehicle in various scenarios. For instance, the vehicle may drive along a closed course or selected roadway. This may be done with no nearby objects, such as other vehicles, bicycles, pedestrians, street signs or construction signs, vegetation, etc. As the vehicle drives, the sensors (e.g., Lidar, radar, imaging, etc.) gather data according to their respective fields of view. This information will be used to develop a 3D mesh for each sensor, which jointly will comprise an overall model for the particular vehicle.

As discussed here, points inside the mesh (points at lesser range than predicted by the model's range image) might be real objects. As such, they are not filtered out; rather, they are passed on to perception pipeline (e.g., part of perception system 228 of FIG. 2). In contrast points falling outside the mesh (or beyond model's predicted range) are filtered out. This is because such points would be occluded by the vehicle itself and so must be from the vehicle itself or are spurious returns.

When driving the vehicle to acquire the real-world data, different vehicle setups will be evaluated, for instance to account for "deformable" parts of the vehicle, e.g., parts that can be turned, opened or closed, or have different positions. By way of example, the wheels can be turned to the maximum extent possible to the right and left, for instance by making a U-turn or a multi-point turn (e.g., a K-turn), to check the maximum angle, etc. When the vehicle is parked, the trunk, doors, and possibly the hood may be partially or fully opened. And the side view mirrors may pivot toward or away from the door. The Lidar and other sensors can be used to detect such vehicle-created obstructions that may generate self-returns. The sensors can also be used to detect other situations, e.g., when passengers stick their arms out of the windows, or when dust, water or snow spray from the tires, etc. Different models may be developed or otherwise maintained for specific configurations or situations. Thus, in one example, a given model may be shared across all vehicles of the same make and/or same model. And in another example, a model is built for each unique vehicle (one model per vehicle identification number).

For instance, the real-world driving can account for different driving environments and conditions, such a dusty road surface, gravel or other debris sprayed up by the tires, exhaust emissions, etc. It will also account for sensor inaccuracies. Dust, gravel, debris, water or snow spray, etc., may be localized to certain regions of the vehicle, such as adjacent to the tires or wheel wells. In one example, this resultant information should not be treated as part of the vehicle when developing the 3D meshes and resultant vehicle model. However, in another example, such information may be incorporated into a given model. One reason to include information in a given model is that it may better represent what a given sensor typically sees and thus should ignore during driving. However, there is a possibility that this could make it difficult to detect when a real obstacle to which the vehicle should react is in the region that dust, gravel, debris, etc., tend to appear. Including this type of information may differentiate between transient items (e.g., dust, gravel, debris, water or snow spray, etc.) and a pedestrian, bicyclist or other object adjacent to the vehicle.

The real-world driving may include one or both of manual driving and fully autonomous driving. It can be helpful to obtain sensor data that is obtained with both types of driving. For instance, manual driving may involve "corner case" states that would be rare to encounter when driving autonomously (e.g., multi-point turn, driving waving out the window, etc.). The driving may be structured, for example by having the vehicle or driver to perform certain actions, such as turning, braking, accelerating or decelerating in specific situations. The driving may also be structured so that data is captured at different times of day and/or under different lighting conditions, for instance at dawn or dusk where the lighting may impact results detected by certain sensors. Similarly, data may be captured for different weather conditions (e.g., snow, sleet or rain, as well as on a clear, dry day), as well as different seasons. The sensor data gathering may be implemented as a specific set of one or more stand-alone training operations. Alternatively, it may be performed as part of a calibration process or may take place during non-calibration driving operations.

In general, the acquired information from the various scan and scenarios for a given vehicle is collected and provided to a computing system for analysis and modeling. The sensor data point clouds can be stored in an organized format, such as a linearized matrix of points. Some of the gathered sensor data can be initially filtered out and not stored because they cannot be part of the vehicle due to not satisfying a predetermined range condition. For instance, ground points (sensor data of the ground on which the vehicle is positioned) are not part of the vehicle. This may include not satisfying a selected height threshold associated with the vehicle or the position of the sensor. Other sensor data may be filtered out because even using a coarse "naïve" geometric model the points of such sensor data are located too far to be part of the vehicle. By way of example, a sphere or other geometric shape may be associated with a particular sensor. Here, if the points fall outside of the given shape, they may be automatically excluded from further consideration when developing the 3D mesh. In another case, this coarse geometric model could be a bounding box of the vehicle, which would be specified in the vehicle frame and shared across all sensors, and would imply a different range condition at different angles for each sensor. One or more such coarse model-based filtering operations could take place in succession or in parallel. The computing system takes the resultant sensor information and projects the aggregated sensor data into a range image (e.g., a 2D grid from each sensor's perspective). The minimum range across all aggregated scans in the data is recorded for each cell in the range image, as well as statistics such as range variance, return intensity, etc. From the 2D range image and the given sensor's calibrated extrinsic pose, the system is able to generate a 3D mesh in vehicle frame coordinates. In other words, the system performs a transformation from sensor frame coordinates to vehicle frame coordinates. The 3D mesh may be stored, e.g., as an image (2D grid) with a channel for the x-coordinate, a channel for the y-coordinate, and a channel for the z-coordinate. The 3D meshes associated with the various sensors may be integrated to form an overall vehicle model of the given vehicle, or used independently on a per-sensor basis.

The purpose of transforming to 3D vehicle frame coordinates is to account for differences in sensor position/orientation when the model is loaded onto or otherwise employed with a different vehicle. A separate calibration procedure may be used to determine the vehicle-specific sensor position/orientation. Once the 3D mesh is loaded in vehicle frame into a new vehicle, it is re-projected into the 2D range image in the new vehicle's sensor frame using its individually-calibrated sensor position/orientation. Then during operation (the operational phase), this can be checked against the 2D grid. This approach is extremely computationally efficient, as compared to trying to determine where each point lies on the 3D mesh.

Additional aspects factored into this approach include intensity. For instance, an intensity channel (e.g., stored as a grayscale image corresponding pixel-wise to the stored 3D mesh faces) can be included in the 3D model to account for different colors or lighting ranges detected by the sensors. This can help, e.g., to distinguish between a dust cloud and a pedestrian standing next to the vehicle (if dust returns were included in the vehicle model), or to distinguish between the vehicle and a pedestrian standing next to it.

Similarly, whether a sensor is dirty, waterlogged, or otherwise has its view blocked by debris during operation can also be detected by comparing the observed data against the model of the vehicle's shape and appearance (including the mesh geometry and intensity).

Data from other sensors of the vehicle can be employed to detect different vehicle configurations. For instance, various sensors may indicate whether a door is open, the wheel angle, and any other articulated state of the vehicle. This allows the system to use an appropriate model conditioned on that particular state, e.g., when performing the task of self-return filtering or the task of sensor blockage detection. By way of example, there may be a specific model for "sliding door open", which may be different than a model for "sliding door closed".

During modeling, the system can then create "hard negatives". Hard negatives are examples that pop up during online operation where the model fails to filter out part of the vehicle (e.g., when turning, some of the tire appears as an obstacle and the vehicle slams on brakes and gets stuck behind the imaginary obstacle). In this case, the system or a human operator may verify that no obstacle was actually present. Based on this, the system would add this data back into the data set for the model (along with its previous data).

In this way, hard negatives can be used to improve the model to better handle similar cases.

The 3D model may be developed by the computing system using a machine learning approach. For instance, a deep neural network could be employed to perform the binary classification task of self-return filtering. During learning, the labeled instances are split into training and test sets, which are fed into an optimization (such as stochastic gradient descent using cross-entropy loss) to select the best classifier parameters. These parameters are then fixed and used to estimate "true or false" on new data encountered during an operational phase. The model can be trained using the acquired scan data, for instance with positively-labeled instances where there is an obstruction due to a deformable part of the vehicle, dust or debris, etc.; and negatively-labeled instances with no obstruction present. The training could also include, e.g., placing pedestrians or other objects around the vehicle, or evaluating arbitrary log data and employing a labeler to pick out which laser returns near the vehicle are real objects the system should detect and which are not.

In addition to performing vehicle specific analysis and transferring a model from one vehicle to another, the modeling phase can incorporate information obtained from many different vehicles of the same make and/or model. Here, in addition to the range image for an initial vehicle (the "canonical" range image), the system records an extrinsic transform from a sensor frame to a vehicle frame ($\overline{Tv{\to}s}$) Then, for a new vehicle with a slightly different extrinsic transform ($Tv{\to}s$), the system transforms the canonical range image to a vehicle-specific image by applying the transform:

$$(Tv{\to}s)[(\overline{Tv{\to}s})]^{-1}$$

This transform may be computed once at initialization. Once the 3D model (or models) is developed for vehicles of the same make and/or model, the 3D model is provided to such vehicles to use during future fully or partially autonomous driving.

Figure 5A:
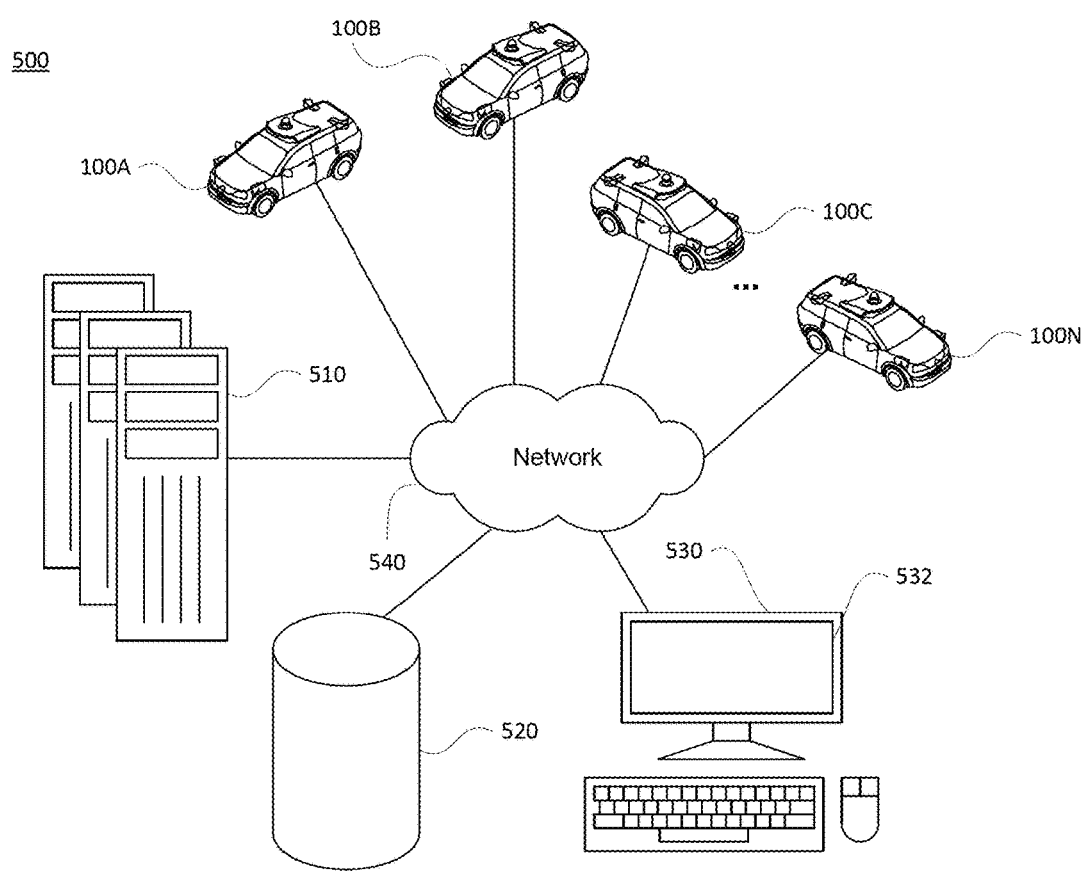
FIGS. 5A-B are pictorial and functional diagrams of an example system in accordance with aspects of the disclosure.
Figure 5B:
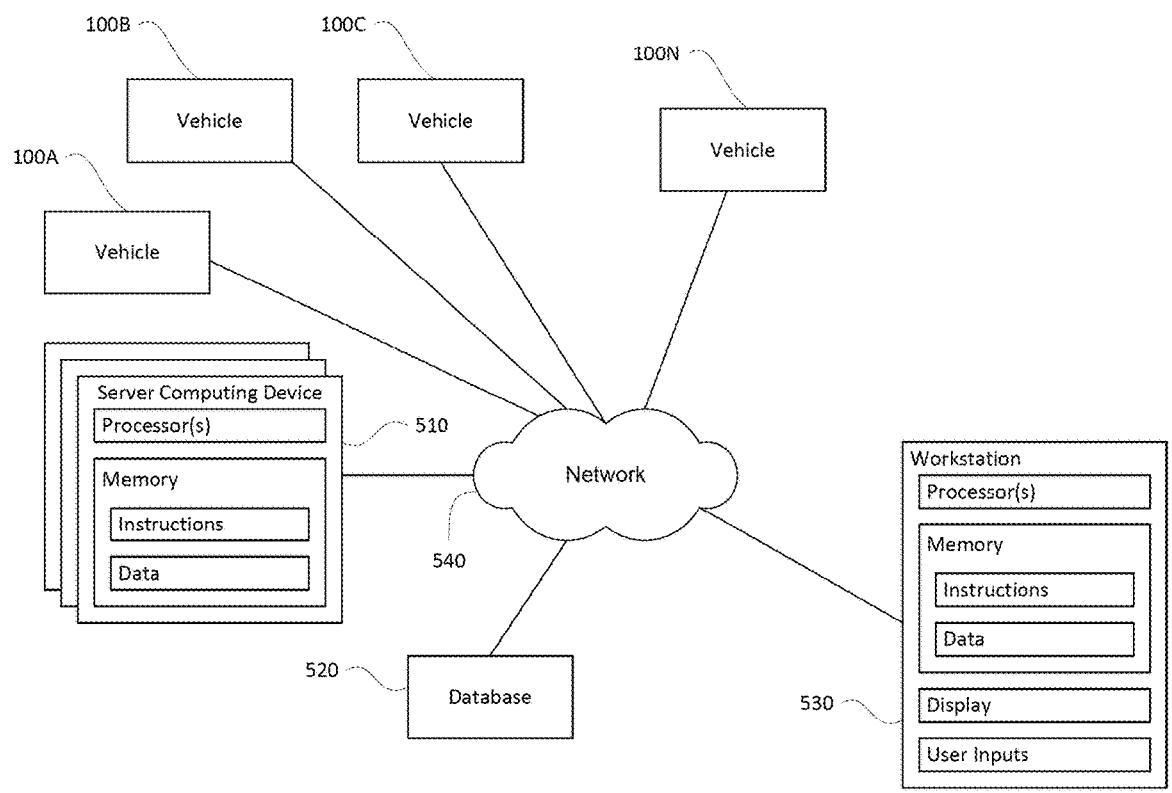

The system that performs the modeling may be part of a system, such as shown in FIGS. 5A-B. FIGS. 5A-B are pictorial and functional diagrams, respectively, of an example system 500 that includes a plurality of computing devices 510, a database 520 and a workstation 530 connected via a network 540. System 500 also includes various vehicles 100A, 100B, 100C . . . 100N, which may be of the same general type (e.g., same make and/or model). Although only a few vehicles and computing devices are depicted for simplicity, a typical system may include significantly more.

As shown in 5B, each of computing devices 510 may include one or more processors, memory, data and instructions. Such processors, memories, data and instructions may be configured similarly to one or more processors 204, memory 206, instructions 208, and data 210 of computing device(s) 202.

The network 540, and intervening nodes, may include various configurations and protocols including short range communication protocols such as Bluetooth, Bluetooth LE, 802.11, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 510 may include one or more server computing devices having a plurality of computing devices, e.g., a load balanced server farm, that exchange information with different nodes of a network for the purpose of receiving, processing and transmitting the data to and from other computing devices. For instance, one or more computing devices 510 may include one or more server computing devices that are capable of communicating with computing device 202 of each vehicle 100, as well as workstation 530 via the network 540. For example, the vehicles 100A . . . 100N, may be a part of a fleet of vehicles that can be dispatched by server computing devices 510 or workstation 530 to various locations. In this regard, the server computing devices 510 may function as a modeling computing system which can be used to generate 3D models of the vehicles. In addition, server computing devices 510 may use network 540 to transmit and present information to a user, such as user of workstation 530, on display 532 of computing devices 530. In this regard, computing device (workstation) 530 may be considered a client computing device.

As shown in 5B, workstation 530 may be a personal computing device intended for use by a user and have all of the components normally used in connection with a personal computing device including one or more processors (e.g., a central processing unit (CPU)), memory (e.g., RAM and internal hard drives) storing data and instructions, a display such as displays 532 (e.g., a monitor having a screen, a touch-screen, a projector, a television, or other device that is operable to display information), and user input devices (e.g., a mouse, keyboard, touchscreen or microphone). The workstation 530 may also include a camera for recording video streams, speakers, a network interface device, and all of the components used for connecting these elements to one another.

Although the workstation 530 may comprise a full-sized personal computing device, it may alternatively comprise a mobile computing device capable of wirelessly exchanging data with a server over a network such as the Internet. By way of example only, workstation 530 may be a mobile phone or a device such as a wireless-enabled PDA, a tablet or laptop PC, or a netbook that is capable of obtaining information via the Internet or other networks. As an example the user may input information using a small keyboard, a keypad, microphone, using visual signals with a camera, or a touch screen.

A user of workstation 530 may be able to control or modify aspects of the 3D model generation. For instance the user may label or categorize a given set of sensor data as a self-return from a deformable portion of the vehicle, or to indicate that the sensor data is actually a dust cloud, water or snow spray, etc. Here, the user may identify positive and negative examples of self-returns. Alternatively or in addition, the user of the workstation 530 may set up scenarios and conditions for the data gathering of the training phase.

Once the vehicle's 3D model is developed and shared with one or more vehicles, it can be used to evaluate new query points to determine if they are self-returns (or transient, etc.) or not. For example, if an observed data point's range lies within a tolerance of the range predicted by the 3D model, the vehicle's on-board system may conclude it is a self-return (and filter it out). If its range lies beyond the model, the system may conclude it should be occluded by the vehicle and thus must be noise or a false artifact (and also filter it out). However, if it lies closer than the model, then it is likely a return from an external object. Other recorded features may also be used in the decision of whether the return is from the vehicle itself or not. This may include return intensity, per-pixel range variance (e.g., for articulated parts of the vehicle, such as the wheels), etc.

Figure 6A:
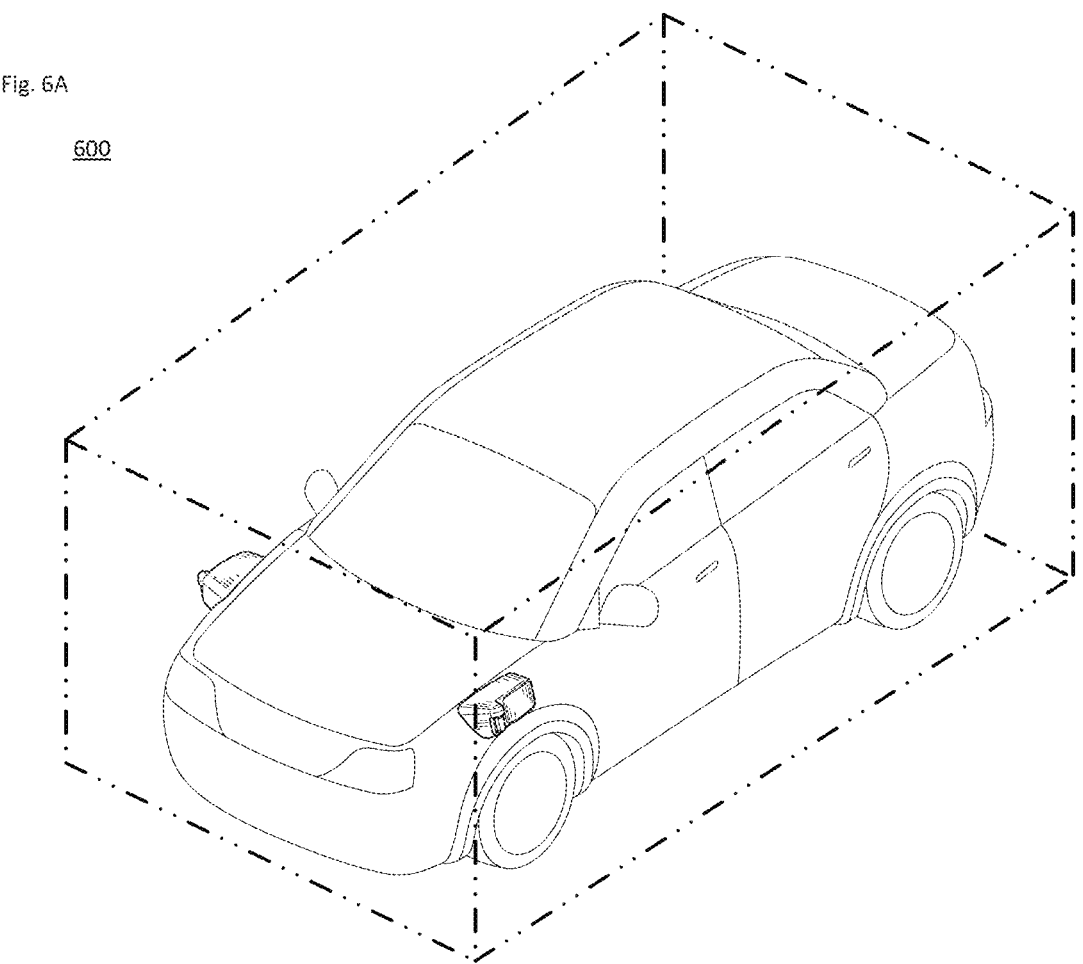
FIGS. 6A-6B contrast a bounding box approach from a modeling approach in accordance with aspects of the disclosure.
Figure 6B:
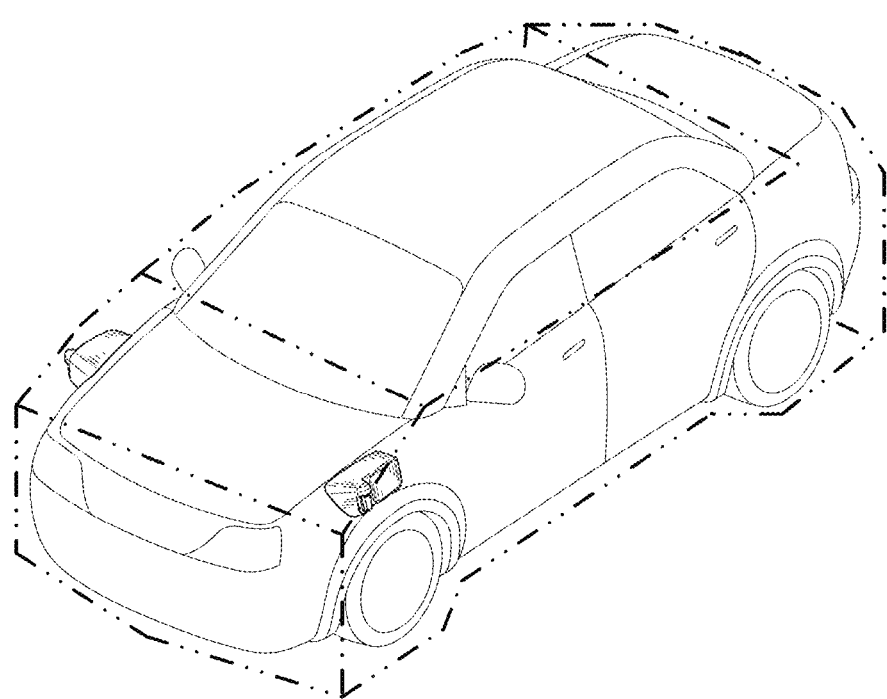

The end result is a robust, global model (or set of models) that excludes sensor data about the vehicle (self-returns) and either excludes or accounts for other sensor data, such as due to transient conditions caused by dust, water or snow spray, etc. FIGS. 6-7 contrast a bounding box approach with such modeling. For instance, FIG. 6A illustrates an example bounding box 600 arranged as a rectangular box about the vehicle. In contrast, FIG. 6B illustrates a model 610 in accordance with the above-described techniques. It can be seen that the model 610 is more tightly constrained about the vehicle.

Figure 7A:
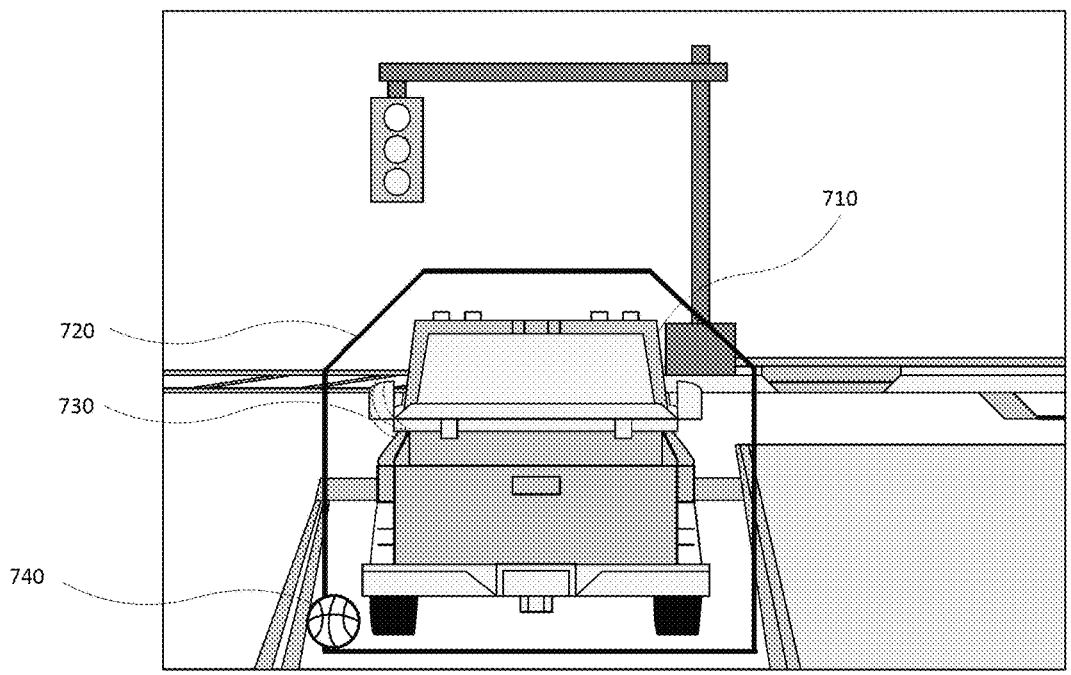
FIGS. 7A-7B illustrate contrast exemplary signal situations in accordance with aspects of the disclosure.
Figure 7B:
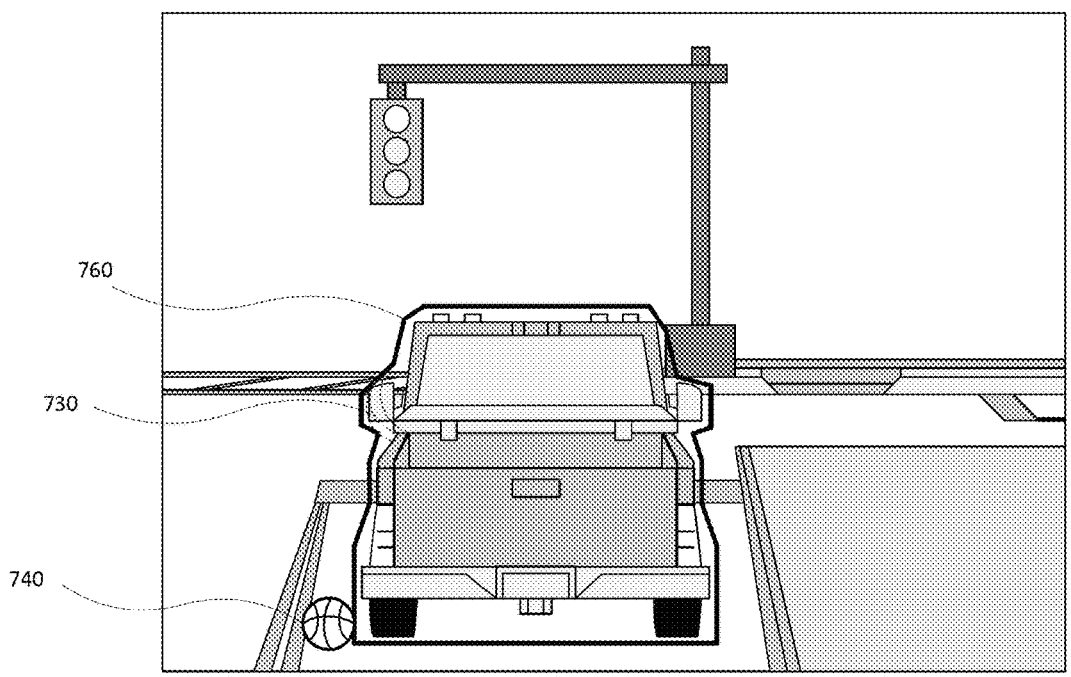

FIGS. 7A-B show how such modeling is advantageous. In particular, FIG. 7A illustrates a scenario 700 with a vehicle 710 having a bounding box 720. Here, a set of self-return data 730 (illustrates as 3 dashed arcuate lines lying on the driver's side view mirror) falls within the bounding box 720. This figure also shows another set of return data 740 from an object such as a basketball. This return data lies partly within and partly outside of the bounding box 720. In this bounding box approach, the on-board system may not be able to discern whether the return data 730 and/or 740 should be ignored or accounted for when analyzing the external environment.

In contrast, the example 750 of FIG. 7B includes vehicle model 760. The model 760 has been developed to account for self-returns and other signals. For instance, anything appearing in the free space between a given sensor mounted on the vehicle's side (e.g., quarter panel) and the side mirror that juts out would be inside the mesh. This might be a real object (e.g., pedestrian). In contrast, anything behind that side mirror from the given sensor's perspective is blocked from its view, and so cannot be a real object. And anything lying exactly on the side mirror would lie exactly on the mesh surface and would be a self-return that also should be filtered out.

So in this example, the return data 730 would be marked as a self-return and filtered out from the set of received sensor data (and thus be flagged for exclusion by the vehicle's perception or planning system or otherwise ignored). In contrast, because return data 740 falls outside the scope of model 760, the object associated with this return data would be detected by the sensor system, and this information would be factored into operation of the vehicle by the planning system.

Additional advantages of this modeling approach are the ability to validate proper functioning of the vehicle's sensors during operation, to find sensor blockages (like a dirty or damaged Lidar window), to validate sensor calibration, to help perform calibration, and to identify car defects like body damage.

Figure 8A:
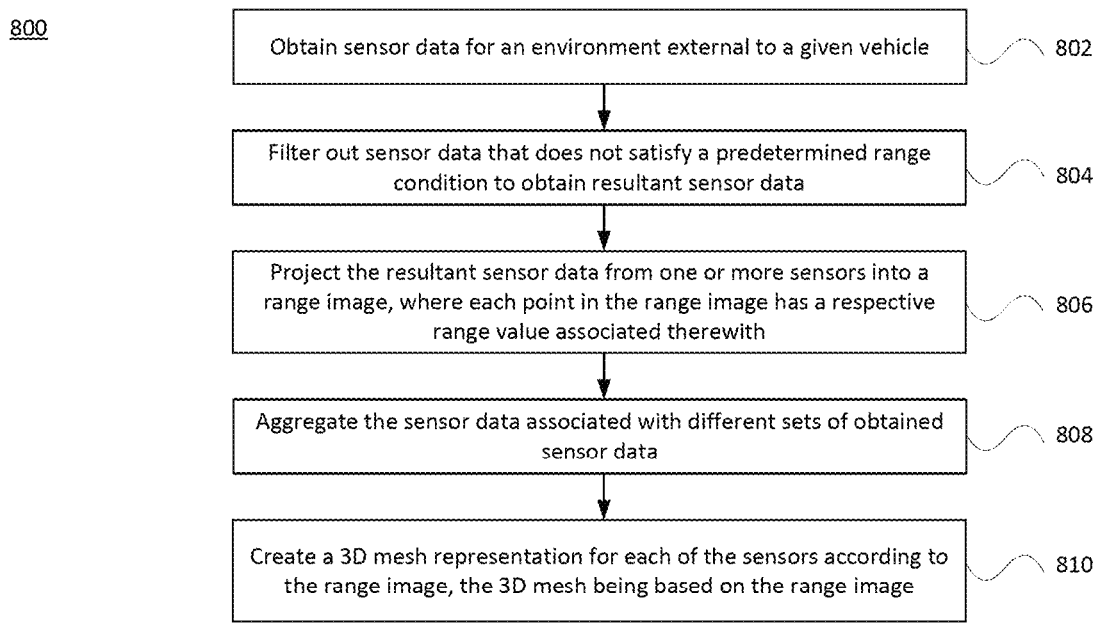
FIGS. 8A-B are example flow diagrams in accordance with aspects of the disclosure.

FIG. 8A is a flow diagram 800 of an example process for generating a field of view model in accordance with the approaches discussed herein. While items are shown in a particular, order, the processes may be performed in parallel or in a different order unless expressly stated herein. At block 802, sensor data is obtained for an environment external to a given vehicle. The sensor data is generated by one or more sensors on the vehicle, such as Lidar, radar and/or imaging sensors, each of which may have a particular field of view. The sensor(s) may directly sense ranges to objects according to the sensor data. At block 804, the sensor data is filtered so that data which does not satisfy a predetermined range condition is excluded from further consideration. As noted above, ground points or other points located too far away may be excluded. The resultant sensor data is then further analyzed and processed.

For instance, at block 806, the sensor data is projected into a range image. This may be done on a per-sensor basis. The data in the projected range image includes a plurality of points. Each such point has a respective range value associated therewith. The range value may be a minimum or maximum range value, or a set of ranges [min, max]. At block 808, the sensor data associated with different obtained sets is aggregated. By way of example, a given lidar sensor may collect multiple sets of results as the vehicle drives through the environment. Or various tests may be performed at different times (e.g., at night, during the day, under different weather conditions, etc.). The aggregation may result in a minimum value across the aggregated data sets. At block 810, the system creates a 3D mesh representation for each of the one or more sensors based on the range image. Creating the 3D mesh representation for each of the one or more sensors may include performing a transformation from sensor frame coordinates (a sensor frame) to vehicle frame coordinates (a vehicle frame). The 3D mesh representation for each sensor may also be encompassed by the selected points not exceeding a coarse bounding box vehicle model.

Figure 8B:
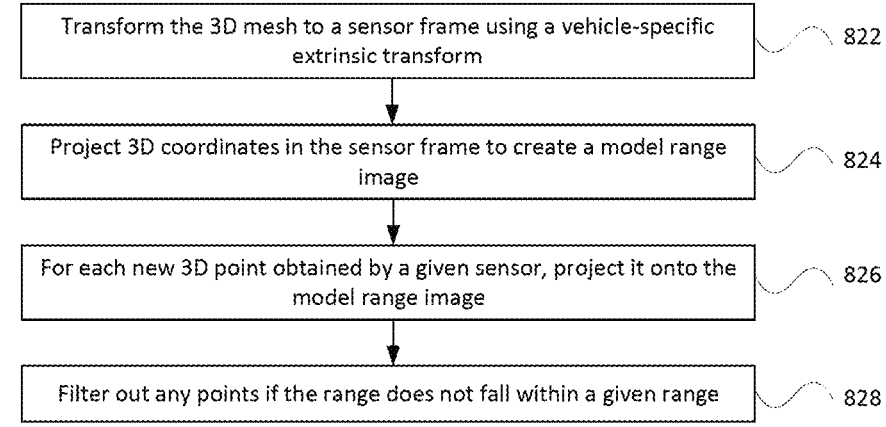

FIG. 8B illustrates a flow diagram 820 of an example method of filtering points according to the 3D mesh representation. At block 822, the 3D mesh representation for a given sensor is transformed to a sensor frame. The 3D mesh representation has 3D coordinates in a vehicle frame. The transform is done using a previously calibrated, vehicle-specific extrinsic transform. At block 824, 3D coordinates are projected into the sensor frame to create a model range image. At block 826, for each new 3D point sensed by a given sensor (e.g., a laser/lidar sensor), project that point onto the model range image. By way of example, this would yield pixel coordinates [i,j] and a range (r). Then at block 828, the point is filtered out if the range (r) is equal to or greater than the model range [i,j] minus some discrepancy (ε) to account for small range errors reported by the sensor (where (ε) is greater than zero).

The system is thus able to exclude sensor data outside the 3D mesh representation when detecting objects external to the vehicle during future driving operations. For instance, the system is able to recognize self-returns and other returns and to drive the vehicle in an autonomous mode or otherwise operate accordingly.

According to other aspects of the technology, the system may build the model on-the-fly, for instance while driving in an autonomous mode. The model may be updated when the system is able to determine confidently (from other sensors, environmental knowledge, and/or received information, etc.) that there are no external objects around the vehicle. In this case, the training, modeling, and operating phases can be viewed as being concurrent.

By way of example, when the vehicle is traveling 60 mph on a highway, anything in the space the vehicle just traversed must be empty. There is confidence in this determination because it can be reasonably assumed based on available information that there is no tailgater that close to the vehicle, and/or also because if that space were occupied when the vehicle traversed it the system would have detected an imminent collision. Or, alternatively, there may be another vehicle in the nearby environment that can see the vehicle and determine there is no nearby object with its on-board sensors, and communicate such information to the vehicle.

The techniques and approaches discussed above provide for a very accurate mesh or other representation of what is "vehicle" versus what is "environment". And this, in turn, allows the on-board system to make effective decisions during autonomous driving.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   obtaining, by one or more processors, sensor data for an environment external to a vehicle, the sensor data being generated by a plurality of sensors of the vehicle as the vehicle drives through the environment in an autonomous driving mode;
   projecting, by the one or more processors, the sensor data into a range image, the sensor data in the range image including a plurality of points, and each point of the plurality of points having a respective range value associated therewith; and
   creating, by the one or more processors, a 3D mesh representation for each of the plurality of sensors, the 3D mesh representation being based on the range image.

2. The method of claim 1, wherein the projecting is performed on a per-sensor basis.

3. The method of claim 1, wherein each of the plurality of sensors has a respective detection field of view (FOV).

4. The method of claim 3, wherein the plurality of sensors is arranged on the vehicle so that all or part of the FOV for one of the plurality of sensors overlaps with at least a portion of an FOV of one or more other sensors of the plurality of sensors.

5. The method of claim 1, further comprising:
   filtering out, by the one or more processors, a portion of the sensor data that does not satisfy a predetermined range condition to obtain resultant sensor data.

6. The method of claim 5, further comprising:
   discarding, by the one or more processors, the filtered out portion of the sensor data.

7. The method of claim 5, further comprising:
   storing, by the one or more processors, the resultant sensor data.

8. The method of claim 1, further comprising:
   transforming the 3D mesh representation from a vehicle frame to a sensor frame using a vehicle-specific extrinsic transform; and
   projecting 3D coordinates into the sensor frame to create a model range image.

9. The method of claim 8, further comprising:
   for each new 3D point obtained by a given sensor, projecting that new 3D point onto the model range image; and
   filtering out one or more selected points if a range for the one or more selected points does not fall within a given range.

10. The method of claim 1, further comprising generating a model of the vehicle from a combination of the 3D mesh representations for each of the plurality of sensors, wherein the vehicle model is arranged to exclude the 3D mesh representation when detecting objects external to the vehicle.

11. The method of claim 1, wherein obtaining the sensor data includes:
    operating the vehicle in a real-word environment under one or more scenarios; and
    gathering the sensor data of the environment external to the vehicle during operation under the one or more scenarios.

12. The method of claim 11, wherein the one or more scenarios includes at least one of:
    a turning scenario in which one or more wheels of the vehicle are turned to a predetermined extent;
    a stationary scenario in which at least one of a door, trunk or hood of the vehicle is placed in a partially or fully open position; or
    a scenario in which at least one window of the vehicle is open and an object is extended out the window.

13. The method of claim 1, wherein creating the 3D mesh representation for each of the plurality of sensors includes performing a transformation from sensor frame coordinates to vehicle frame coordinates.

14. The method of claim 1, further comprising incorporating an intensity channel into the 3D mesh representation to account for different colors or lighting ranges of the obtained sensor data.

15. The method of claim 14, further comprising applying the intensity channel to evaluate whether a sensor on the vehicle is covered by debris, is damaged, or is waterlogged.

16. A processing system comprising:
    a memory; and
    one or more processors operatively coupled to the memory, the one or more processors being configured to:
    obtain sensor data for an environment external to a vehicle, the sensor data being generated by a plurality of sensors of the vehicle as the vehicle is driven through the environment in an autonomous driving mode;
    store the obtained sensor data;
    project the sensor data into a range image, the sensor data in the range image including a plurality of points, and each point of the plurality of points having a respective range value associated therewith; and
    create a 3D mesh representation for each of the plurality of sensors, the 3D mesh representation being based on the range image.

17. The processing system of claim 16, wherein the sensor data is projected on a per-sensor basis.

18. The processing system of claim 16, wherein each of the plurality of sensors has a respective detection field of view (FOV).

19. The processing system of claim 18, wherein the plurality of sensors is arranged on the vehicle so that all or part of the FOV for one of the plurality of sensors overlaps with at least a portion of an FOV of one or more other sensors of the plurality of sensors.

20. The processing system of claim 16, wherein the one or more processors are further configured to filter out a portion of the sensor data that does not satisfy a predetermined range condition to obtain resultant sensor data.

21. The processing system of claim 20, wherein the one or more processors are further configured to discard the filtered out sensor data and store the resultant sensor data in the memory.

\* \* \* \* \*